(12) United States Patent
Doneghue (10) Patent No.: US 6,411,486 B1
(45) Date of Patent: Jun. 25, 2002

(54) SURGE PROTECTED ELECTRICAL POWER DISTRIBUTION SYSTEM

(75) Inventor: Jeffrey A. Doneghue, Lincoln, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/536,330

(22) Filed: Mar. 24, 2000

(51) Int. Cl.$^7$ ................................................. H01C 7/12
(52) U.S. Cl. ..................................................... 361/118
(58) Field of Search ........................... 361/103, 56, 118, 361/124

(56) References Cited

U.S. PATENT DOCUMENTS

| | | | |
|---|---|---|---|
| 1,071,279 A | 8/1913 | Van Deventer | 313/268 |
| 2,309,183 A | 1/1943 | Gilson et al. | 338/315 |
| 2,923,849 A | 2/1960 | Rees | 361/117 |
| 2,942,225 A | 6/1960 | Ricci et al. | 439/114 |
| 3,369,153 A | 2/1968 | Arnold et al. | 361/55 |
| 4,089,032 A | 5/1978 | Dell Orfano | 361/56 |
| 4,532,574 A | 7/1985 | Reiner et al. | 361/660 |
| 4,539,541 A | 9/1985 | Bharteey et al. | 361/35 |
| 4,688,135 A | 8/1987 | Leopold | 361/118 |
| 4,886,468 A | 12/1989 | Harton et al. | 439/212 |
| 4,980,801 A | 12/1990 | Guinda et al. | 361/730 |
| 5,023,747 A | 6/1991 | Lindsay | 361/117 |
| 5,229,909 A | 7/1993 | Tessmer et al. | 361/104 |
| 5,414,587 A | 5/1995 | Kiser et al. | 361/118 |
| 5,483,212 A | 1/1996 | Lankuttis et al. | 335/132 |
| 5,606,299 A | 2/1997 | Innes et al. | 335/202 |
| 5,781,844 A * | 7/1998 | Spriester et al. | 725/149 |
| 5,914,845 A * | 6/1999 | Chase | 361/111 |
| 6,012,937 A | 1/2000 | Campbell et al. | 439/212 |
| 6,052,951 A * | 4/2000 | Daoud | 725/149 |
| 6,055,147 A * | 4/2000 | Jeffries et al. | 361/103 |
| 6,067,483 A * | 5/2000 | Fesmire et al. | 700/296 |

OTHER PUBLICATIONS

Catalog 25–000 Quick Selector 1993, Distribution & Control, Westinghouse Electrical Components Division, Feb. 1993, 2 pp.
PowerMaster™ *Multiple Metering*, Eaton Corporation, May 1996, pp. 1–7 and 17.
SA–460, Cutler–Hammer Commercial Metering Switchboards, Cutler–Hammer, May 1997, 4 pp.

* cited by examiner

Primary Examiner—Edward H. Tso
Assistant Examiner—Pia Tibbits
(74) Attorney, Agent, or Firm—Martin J. Moran (57) ABSTRACT

An electrical power distribution system includes a main disconnect unit and a surge protector unit. The main disconnect unit includes an electrical power bus having a three-phase power bus and a neutral bus. The separable contacts of a circuit breaker are employed for interrupting current flowing in the three-phase power bus. The surge protector unit includes an electrical power bus having a corresponding three-phase power bus and a neutral bus. Three phase-to-neutral surge protectors are employed for protecting downstream loads from surges or transients on the power buses. The electrical power bus of the surge protector unit electrically engages the electrical power bus of the disconnect unit to form a series electrical connection of the electrical power buses for the loads.

20 Claims, 8 Drawing Sheets

SURGE PROTECTED ELECTRICAL POWER DISTRIBUTION SYSTEM

BACKGROUND OF THE INVENTION

1. Field of the Invention

This invention relates to electrical power distribution systems and, more particularly, to electrical power distribution systems employing a disconnect and a surge protector. The invention also relates to electrical power distribution systems employing a main disconnect, a surge protector, and a plurality of meters.

2. Background Information

Main disconnect units include load centers, motor control centers, busways, panelboards, switchboards, switchgear, circuit breakers, fuses, and switches for interrupting electrical power between a power source and one or more loads.

Meter centers are often used in combination with main disconnect units in order to provide metering of electrical power delivered to multiple tenants from a common feeder system. Typically, the meter center includes an upright cabinet forming an enclosure divided into side-by-side meter and disconnect switch compartments. Feeder buses, typically three phase buses and a neutral bus connected to the electric utility lines, extend horizontally through the rear of the cabinet. The meter compartment has pairs of vertical supply buses. Each pair of the vertical supply buses is connected to a selected pair of the feeder phase buses. In turn, a pair of tenant buses for each metered circuit extends horizontally from the disconnect switch compartment into the meter compartment. See, for example, U.S. Pat. No. 6,012,937.

If surge protection is desired, then customers (e.g., owners of buildings having multiple tenants, such as offices or apartments) would have to purchase separate surge protection devices and wire those surge protection devices into the electrical power distribution system themselves.

Alternatively, the individual tenants may employ surge protection strips at selected power outlets.

There is a need, therefore, for an improved electrical power distribution system which is capable of withstanding surges.

There is also a need for such an improved electrical power distribution system, which reduces the labor required to install and remove a surge protection device in the electrical power distribution system.

Accordingly, there is room for improvement.

SUMMARY OF THE INVENTION

These needs and others are satisfied by the invention which is directed to an electrical power distribution system comprising a disconnect unit including an electrical power bus having a plurality of power lines, and means for interrupting current flowing in the power lines; and a surge protector unit including an electrical power bus having a plurality of power lines, and means for protecting at least one load from surges or transients on the power lines. The electrical power bus of the surge protector unit electrically engages the electrical power bus of the disconnect unit to form a series electrical connection of the electrical power buses for the at least one load.

Preferably, the electrical power bus of the surge protector unit has a first end and an opposite second end, the electrical power bus of the disconnect unit has a first end and an opposite second end, and one of the first and second ends of the electrical power bus of the surge protector unit is secured to one of the second and first ends, respectively, of the electrical power bus of the disconnect unit.

As another refinement, each of the units includes an enclosure, and each of the electrical power buses includes a first rigid bus bar and a second rigid bus bar. The first rigid bus bar is offset at a first end and projects beyond the enclosure at a second end. The second end extends into a gap between the offset of the first rigid bus bar of an adjacent one of the units and is clamped by a fastener to electrically connect the electrical power buses of side by side ones of the units.

As another aspect of the invention, an electrical power distribution system comprises a main disconnect unit including an electrical power bus having a plurality of power lines, and means for interrupting current flowing in the power lines; a surge protector unit including an electrical power bus having a plurality of power lines, and means for protecting a plurality of loads from surges or transients on the power lines; and a multiple meter unit including a meter for each of the loads and an electrical power bus having a plurality of power lines. The electrical power buses of the main disconnect unit, the surge protector unit and the multiple meter unit are electrically connected in series, and the electrical power bus of one of the units electrically engages the electrical power buses of the other two units.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "surge" shall expressly include, but not be limited to, a sub-cycle disturbance in an alternating current waveform that includes a high frequency event or a sharp discontinuity of the waveform.

As employed herein, the term "transient" shall expressly include, but not be limited to, surges.

Figure 1:
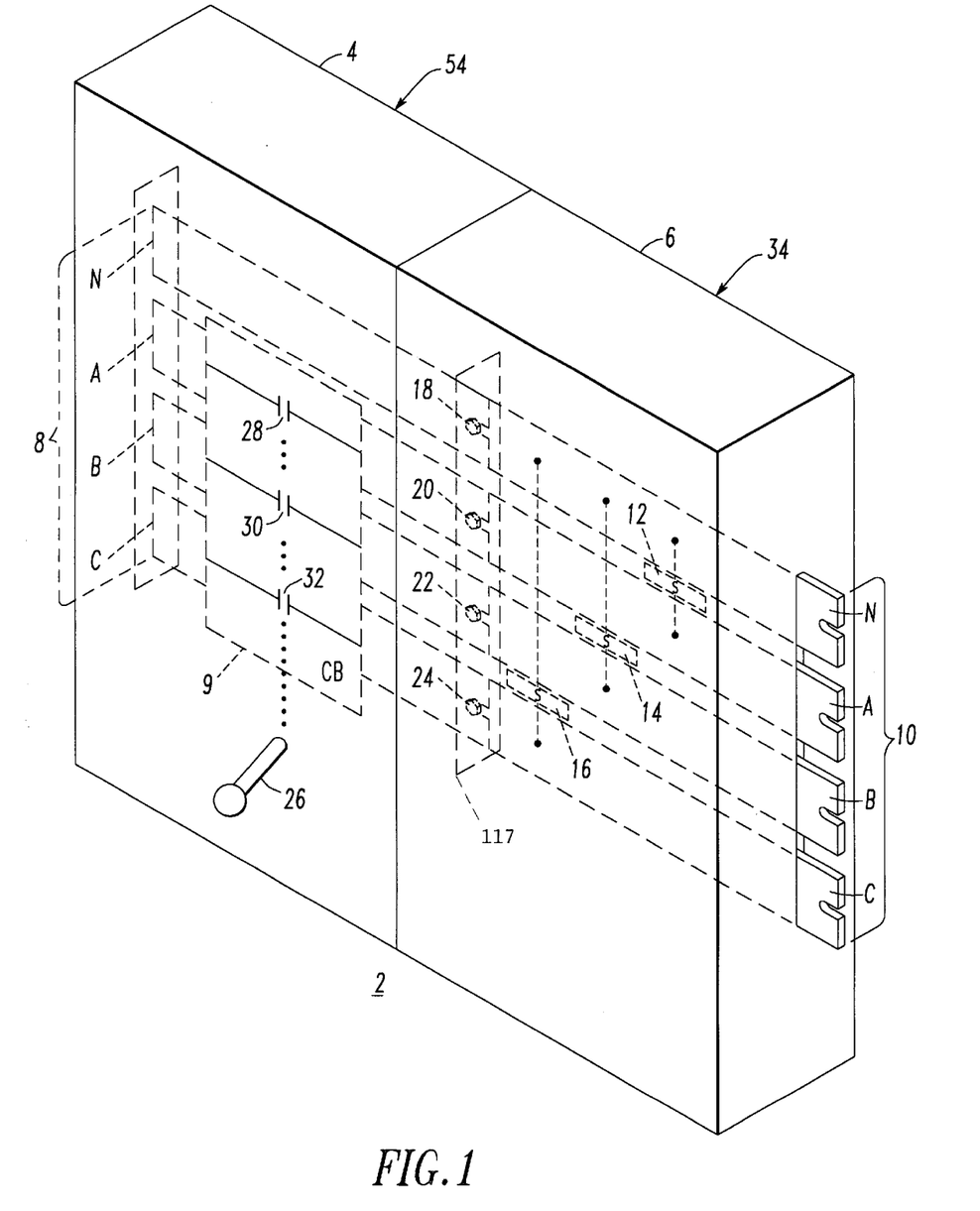
FIG. 1 is an isometric view of a main disconnect unit and a surge protector unit in accordance with the invention.

Referring to FIG. 1, a surge protected electrical power distribution system 2 for one or more loads (not shown) is illustrated. The system 2 includes a disconnect unit 4 and a surge protector unit 6. The exemplary disconnect unit 4 includes a three-phase electrical power bus 8 (shown in hidden line drawing) having a plurality of power lines A,B,C and a neutral line N, and a three-pole circuit breaker (CB) 9 (shown in hidden line drawing) for interrupting current flow in the three-phase power lines. The exemplary surge protector unit 6 includes a three-phase electrical power bus 10 having the power lines A,B,C and the neutral line N, and three line-to-neutral surge protectors (S) 12,14,16 for protecting the loads from surges and/or transients on the power lines. The electrical power bus 10 of the surge protector unit 6 electrically engages the electrical power bus 8 of the disconnect unit 4 to form a series electrical connection of the electrical power buses 8,10 for the loads.

Preferably, the buses 8,10 are suitably electrically secured by fasteners 18, 20, 22, 24. In the exemplary embodiment, the upstream end of three-phase electrical power bus 8 of the disconnect unit 4 is suitably electrically connected to an electrical power source (not shown) (e.g., a utility's electrical power distribution system), and the downstream end of the three-phase electrical power bus 10 of the surge protector unit 6 is suitably electrically connected to one or more loads (not shown). For example, three-phase power and neutral conductors may be suitably terminated and then bolted to the respective power and neutral lines of the units 4,6. The disconnect unit 4 employs an operating handle 26 to open and close circuit breaker separable contacts 28,30,32, which are in series with the three-phase power lines A,B,C, respectively.

Figure 2:
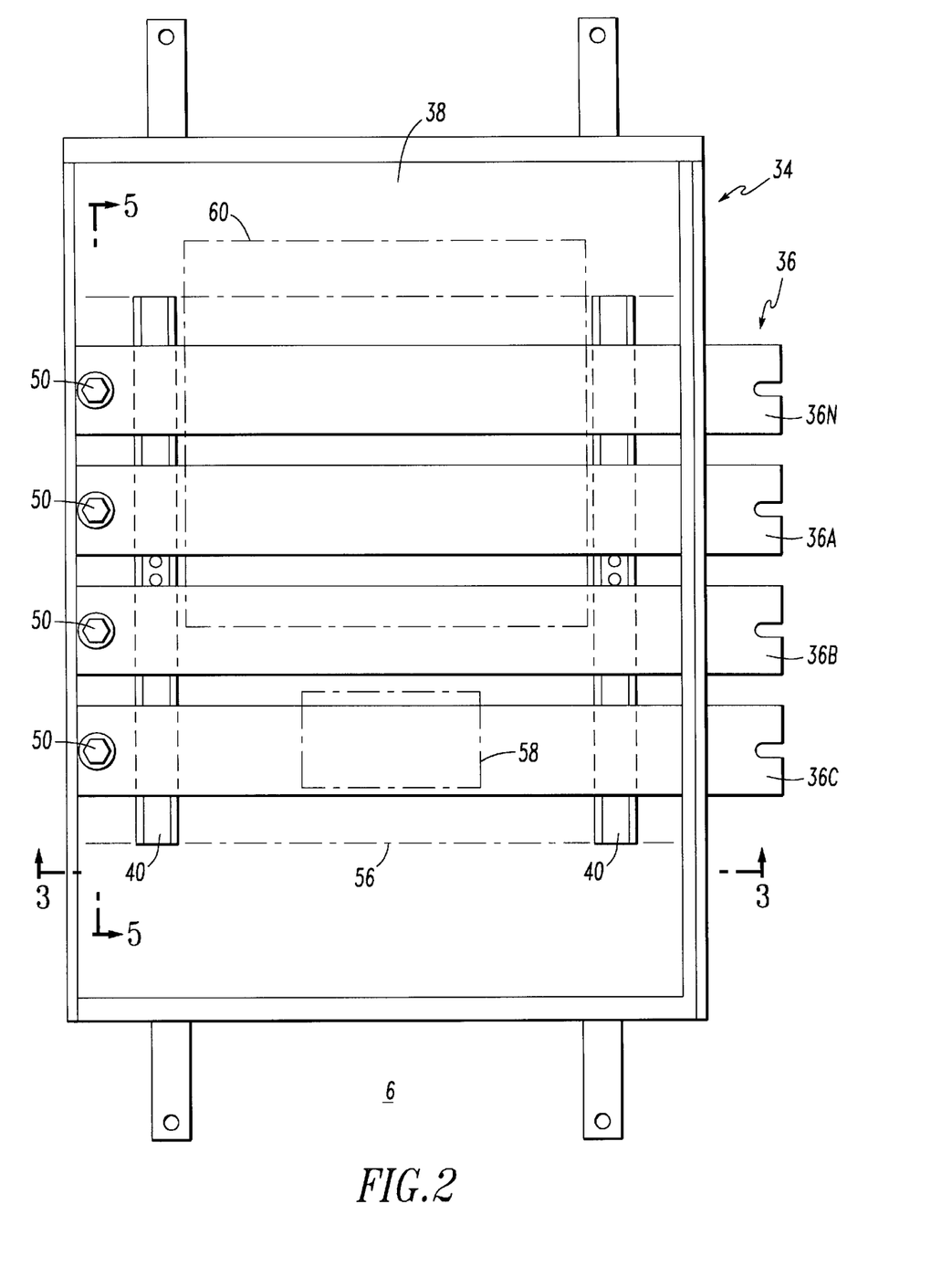
FIG. 2 is a front elevation view of the surge protector unit of FIG. 1 with the front panel of the enclosure removed and with the sealing panel, the switch and the surge protector device shown in phantom line drawing.
Figure 3:
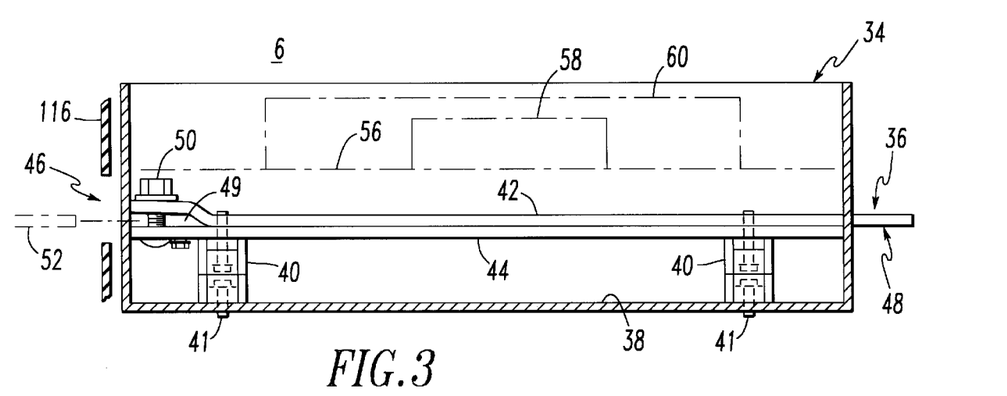
FIG. 3 is a simplified horizontal sectional view through the surge protector unit taken along the line 3—3 in FIG. 2.
Figure 4:
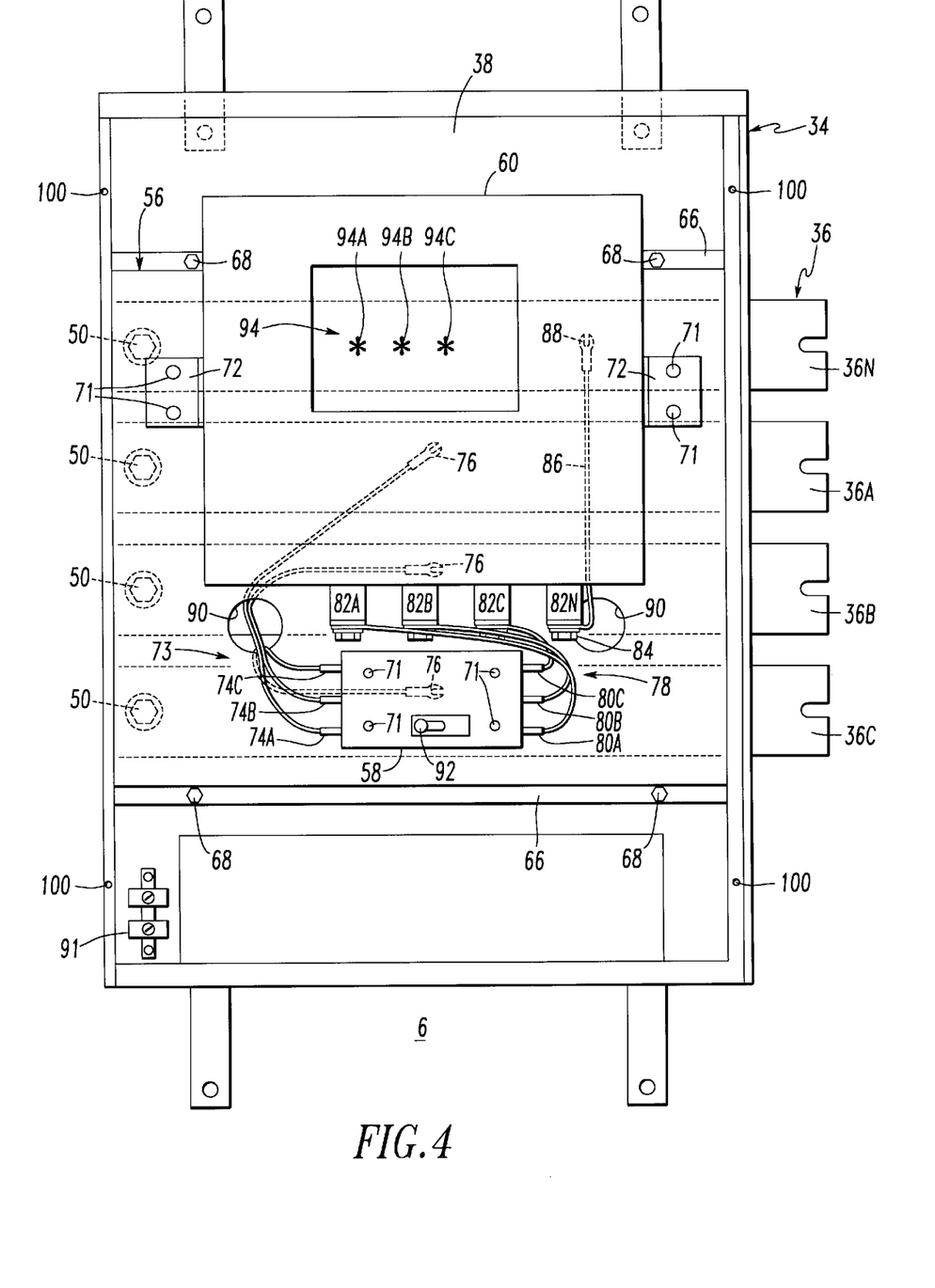
FIG. 4 is a plan view of the surge protector unit of FIG. 1 with the front cover removed.
Figure 6:
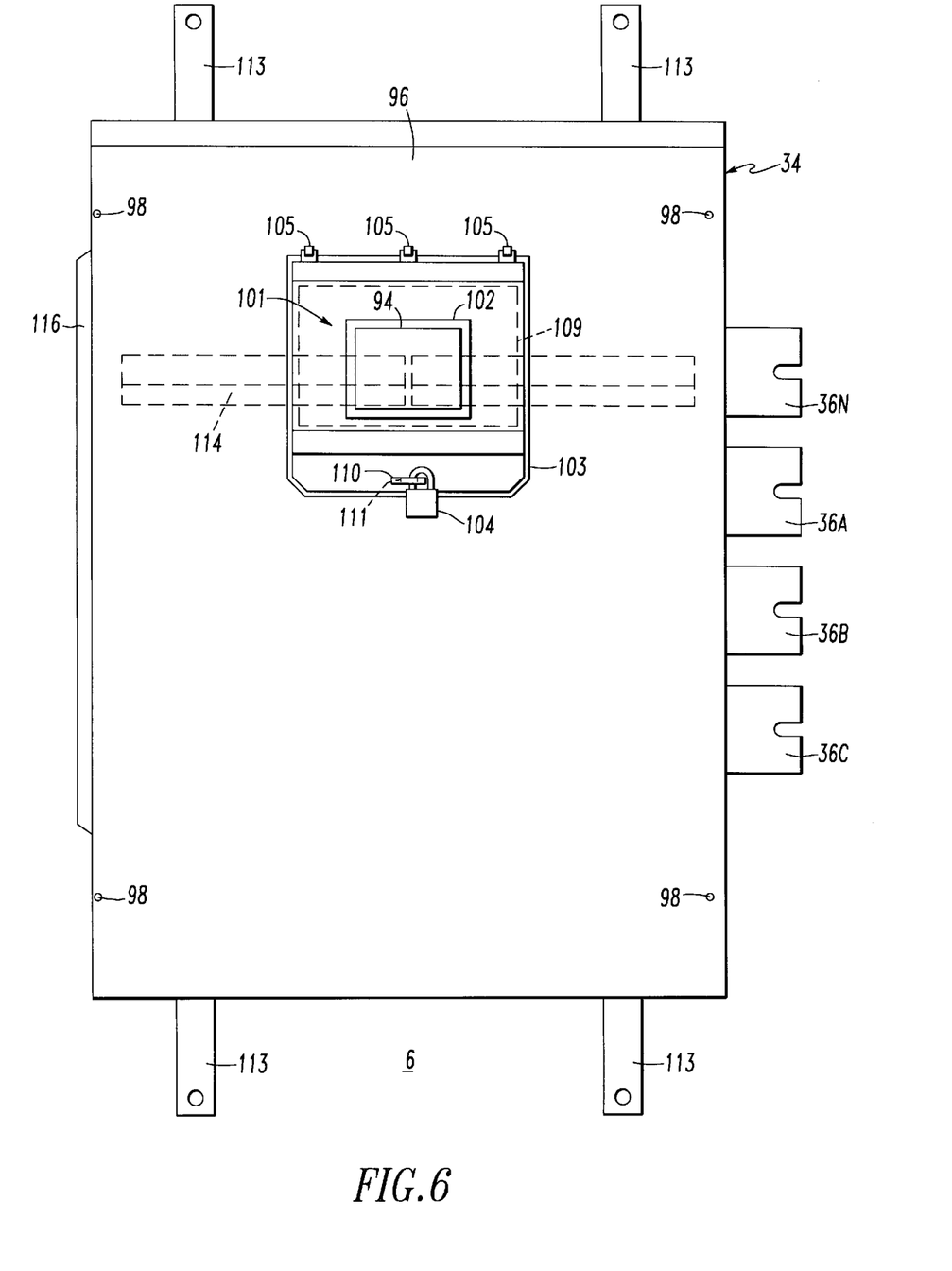
FIG. 6 is a plan view of the front panel of the surge protector unit of FIG. 1.
Figure 12:
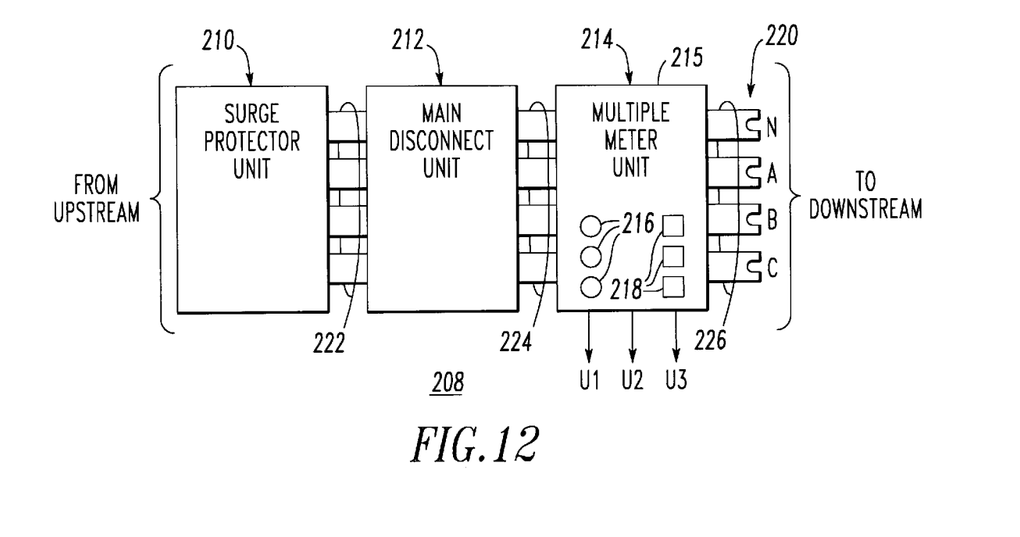
FIG. 12 is a block diagram of another embodiment of an electrical power distribution system in accordance with the invention.

Also referring to FIGS. 2–4, the surge protector unit 6 includes a sixsided cabinet 34 forming an enclosure. In FIG. 2, for convenience of reference, the front panel 96 of FIG. 6 is removed, and the sealing panel 56, the switch 58 and the surge protector device 60 of FIG. 4 are shown in phantom line drawing. Electrical power is provided to the surge protector unit 6 by feeder buses 36 connected in the exemplary embodiment to corresponding buses of the disconnect unit 4 of FIG. 1. Alternatively, as shown in FIG. 12, the positions of the surge protector unit 210 and the main disconnect unit 212 may be reversed. In the exemplary surge protector unit 6, the feeder buses 36 include three phase buses 36A,36B,36C and a neutral bus 36N. These feeder buses 36 extend horizontally through the cabinet 34 and are mounted on a rear wall 38 by spaced apart, vertically extending, insulative supports 40. The supports 40, in turn, are mounted to the rear wall 38 by fasteners 41, as shown in FIG. 3.

As shown in FIG. 3, each of the feeder buses 36 of FIG. 2 includes two rigid copper bus bars 42 and 44. The bus bar 42 is offset at one end 46 and projects beyond the cabinet 34 at the other end 48. The end 48 extends into the gap 49 between the offset end 46 of an adjacent unit (e.g., such as the main disconnect unit 212 of FIG. 12) and is clamped by a bolt 50 for each bus to secure and electrically connect the feeder buses 36 with the corresponding feeder buses 52 (shown in phantom line drawing) of the adjacent unit (not shown) (e.g., the disconnect unit 4 of FIG. 1). It will be appreciated that a wide variety of different configurations are possible (e.g., a main disconnect unit, a surge protector unit, and a multiple meter unit) as the end 48 of the feeder buses 36 is structured for electrical connection to an electrical power bus of another unit (e.g., main disconnect unit, multiple meter unit). For example, as shown in FIG. 1, the disconnect unit 4 includes an enclosure 54, which is adjacent the enclosure 34 of the surge protector unit 6. The electrical power buses 8,10 of the adjacent units 4, 6, respectively, are clamped by the fasteners 18,20,22,24 to electrically connect those buses in series.

Figure 5:
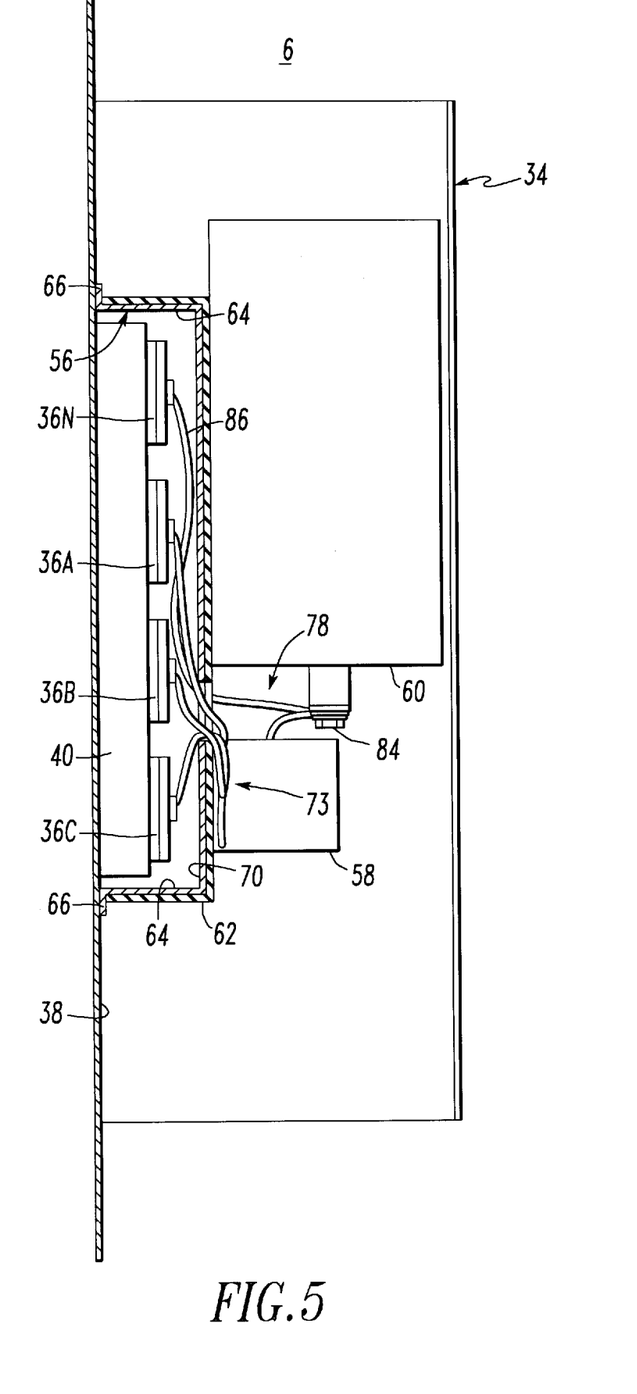
FIG. 5 is a simplified vertical sectional view through the surge protector unit taken along the line 5—5 in FIG. 2.

FIG. 4 is a plan view of the surge protector unit 6 of FIG. 1 with the front cover 96 of FIG. 6 removed. Also referring to FIG. 5, a sealing panel 56, a 3-pole switch 58, a 3-phase surge protector device 60, and a suitable insulator 62 (FIG. 5) are shown. As best shown in FIG. 5, the sealing panel 56 includes a pair of legs 64 each of which has a foot 66 which is secured to the rear wall 38 of the enclosure 34 by a pair of fasteners 68 (shown in FIG. 4). The insulator 62 is disposed on the top 70 of the sealing panel 56 in order to insulate the switch 58 and surge protector device 60 therefrom. The switch 58 is fastened to the top 70 of the sealing panel 56 by fasteners 71. The surge protector device 60 is secured to the top 70 of the sealing panel 56 by fasteners 71 and two L-shaped mounting brackets 72 suitably attached to the sides of the device 60 (shown in FIG. 4). One or more additional insulators (not shown) may be disposed on the phase buses 36A,36B,36C, between those buses and the fasteners (e.g., 71) for the switch 58 and surge protector device 60, in order to preclude any arcing therebetween. In the exemplary embodiment, the switch 58 is a circuit breaker, although any suitable electrical disconnect may be employed. A three-conductor wiring harness 73 is employed to electrically connect the inputs 74A,74B,74C of the three-pole switch 58 to the three phase buses 36A,36B,36C. Each of the three conductors of the wiring harness 73 is directly electrically terminated by a suitable fastener 76 to the corresponding one of the three phase buses 36A, 36B, 36C.

Another three-conductor wiring harness 78 is employed to electrically connect the outputs 80A,80B,80C of the three-pole switch 58 to the corresponding input terminals 82A, 82B,82C, respectively, of the surge protector device 60. Each of the three conductors of the wiring harness 78 is directly electrically terminated by a suitable fastener 84 to the corresponding one of the input terminals 82A, 82B, 82C.

An insulated conductor 86 having a suitable gauge wire (e.g., #10 AWG in the exemplary embodiment) is employed to electrically connect the neutral terminal 82N of the surge protector device 60 to the neutral bus bar 36N. The conductor 86 is directly electrically terminated by a suitable fastener 88 to the neutral bus bar 36N. Preferably, one or more openings 90 are employed in the top 70 of the sealing panel 56 along with corresponding grommet insulators (not shown) for routing the wiring harness 73 and insulated conductor 86 therethrough. A ground terminal 91, suitably electrically connected to the rear wall 38, may be employed for suitably grounding the enclosure 34.

The exemplary switch 58 includes an operating handle 92 which is advantageously employed by a user to remove power from the surge protector device 60, in order to allow safe repair or maintenance to that device.

The exemplary surge protector device 60 removes power disturbances from the electrical power distribution system 2 of FIG. 1 by providing a low impedance shunt path to ground, although a wide range of other surge and/or transient protection devices may be employed. The exemplary surge protector device 60 is a Clipper Power System (CPS) marketed by Cutler-Hammer. For example, the CPS employed in FIG. 4 is catalog number CPS-BX208YBBTCX, which is suitable for a 100 kA surge rating, three-phase Wye (four wires plus ground), basic diagnostics (e.g., a status indicator on each phase), panelboard application, and a form C contact output. It is understood, however, that a wide range of surge protection devices employing a wide range of surge, voltage and current ratings and/or with or without diagnostics and/or with or without outputs may be employed for a wide variety of power line configurations. For example, without limitation, various power line configurations include: (1) single phase (split phase), three wire (i.e., L1/L2/N/G); (2) single phase, two wire (i.e., L1/L2/G); (3) three-phase Wye, four wire (A/B/C/N/G); (4) three-phase Delta, three wire (AIB/C/G); (5) three-phase resistive/ungrounded Wye, four wire (A/B/C/N/G); and (6) three-phase Delta high leg, four wire (A/B/C/N/G). Furthermore, there are a wide range of known devices and arrangements to protect loads from surges and/or transients in power supply voltage. For example, as an alternative to the exemplary shunt or parallel protection, series protection may be employed.

In the preferred embodiment, the three exemplary individual phase-to-neutral surge protection devices (e.g., devices 12,14,16 of FIG. 1) employ corresponding status indicators 94A,94B,94C (e.g., a light emitting diode, which indicates that power is applied to the corresponding power line and that the surge protection device is non-functional).

Figure 7:
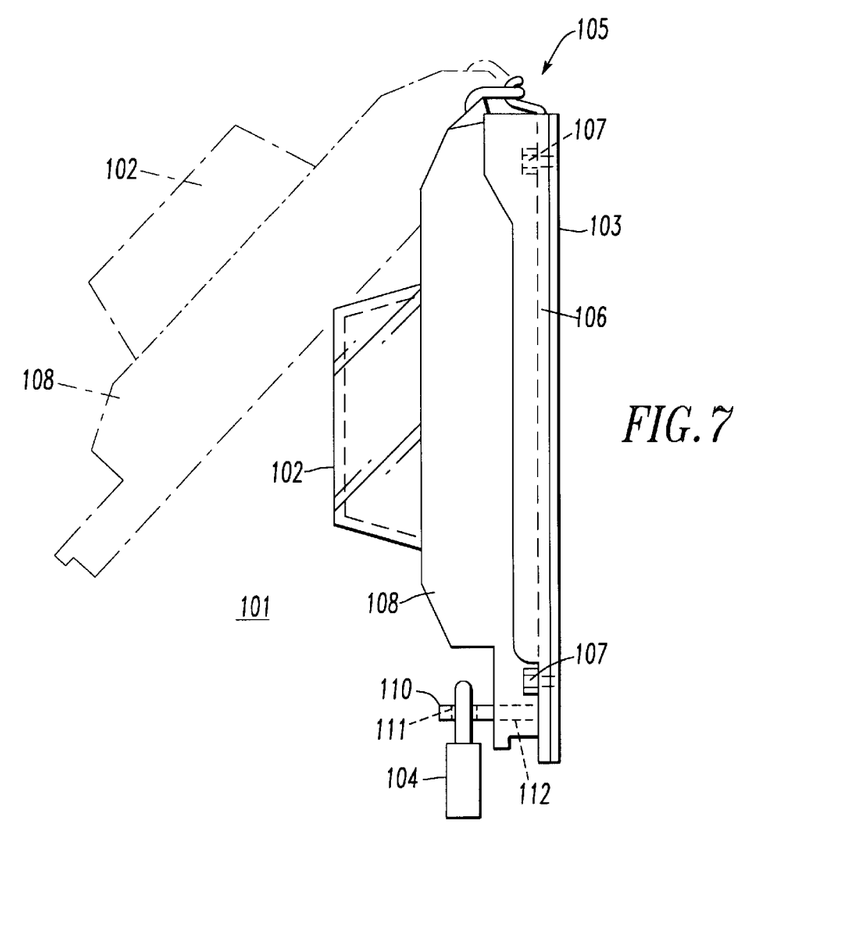
FIG. 7 is a side view of the cover of FIG. 6.

Referring to FIG. 6, the front panel 96 is secured to the surge protector unit 6 by fasteners 98 which engage the enclosure 34 at corresponding openings 100 of FIG. 4. The front panel 96 of the enclosure 34 has a cover 101 for accessing the individual indicators 94A,94B,94C and surge protection devices (not shown) of the surge protector device 60 of FIG. 4. Also referring to FIG. 7, the cover 101 of the enclosure 34 further includes a window 102 (e.g., made of clear plastic) for viewing the indicators 94 therethrough. Preferably, the cover 101 also has a gasket 103 in order to provide a suitably waterproof or raintight cover for application in outdoor environments.

In order to provide safe operation, the cover 101 preferably includes a padlock 104 to limit internal access to only authorized personnel. When the padlock 104 is unlocked, the cover 101 may be opened by pivoting the same about hinges 105. As shown in phantom line drawing in FIG. 7, the cover 101 has a lower portion 106, which is suitably secured to the front panel 96 of FIG. 6 by fasteners 107, and an upper portion 108. When the padlock 104 is removed, the upper portion 108 pivots about the hinges 105 to provide access to the surge protector device 60 through an opening 109 (shown in hidden line drawing in FIG. 6) in the lower portion 106. The lower portion 106 includes a tab 10 which has an opening 111 to accept the padlock 104. The upper portion 108 has an opening 112 to accept the tab 110 of the lower portion 106 when the upper portion is moved to its closed position.

A suitable padlock or interlock (not shown) may also be employed to discourage unauthorized removal of the front panel 96 from the enclosure 34.

Still referring to FIG. 6, the surge protector unit 6 preferably includes mounting brackets 113 suitably attached to the rear wall 38 (FIG. 4) of the enclosure 34 for mounting the unit 6 on a wall (not shown). Also, hangers 114 suitably attached to the rear wall 38 of the enclosure 34 may be employed to initially hang the unit 6 to the wall before securing the three phase buses 36A,36B,36C and neutral bus 36N to an adjacent unit (as shown with the units 4,6 of FIG. 1). Preferably, a gasket 116 is employed on the left side (with respect to FIGS. 3 and 6) of the unit 6 in order to engage the adjacent unit (e.g., unit 4 of FIG. 1) to seal the opening 117 at the end 46 (FIG. 3) of the buses 36A–36C and 36N.

Figure 8:
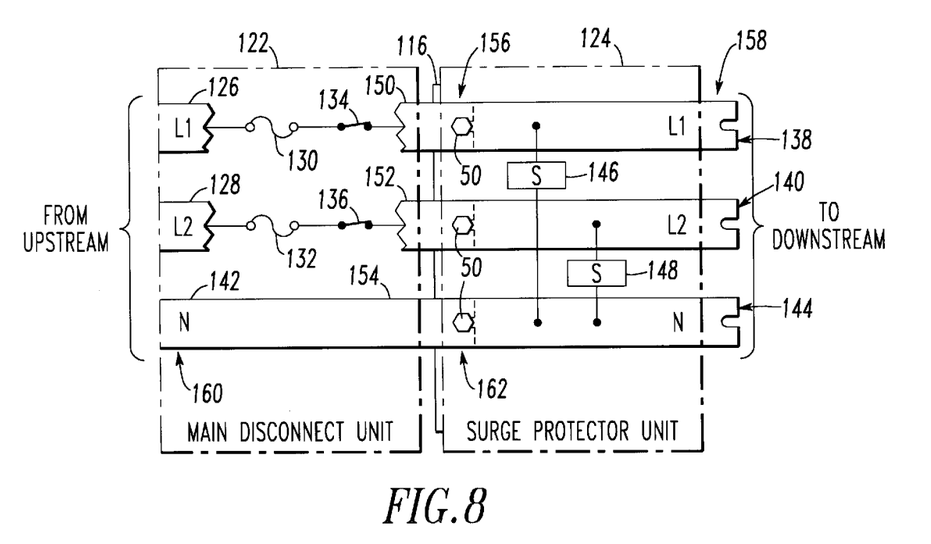
FIG. 8 is a block diagram of another embodiment of an electrical power distribution system in accordance with the invention.

FIG. 8 shows another electrical power distribution system 120 including a main disconnect unit 122 and a surge protector unit 124. The units 122, 124 are situated in the system 120 between an upstream power source (not shown) and other downstream units (e.g., the multiple meter unit 215 of FIG. 12) and/or loads (not shown). The exemplary unit 122 interrupts current flowing in power lines 126,128 and includes fuses 130,132 and switches 134,136 for disconnecting power from the downstream loads on lines L1, L2, respectively. Although exemplary fuses and switches are shown, any suitable current interrupting device, such as a circuit breaker, may be employed. The exemplary electrical power buses 138,140 of the surge protector unit 124 are single-phase, two-line (L1,L2) electrical power buses. The upstream power source (not shown) also provides a neutral line 142 which corresponds to the neutral bus 144 and neutral line N.

Line-to-neutral surge suppressors (S) 146 and 148 (e.g., MOVs) are electrically interconnected between the line L1 and neutral N, and line L2 and neutral N, respectively, of the surge protector unit 124 in order to protect downstream units and/or loads (not shown) from surges and/or transients on such power lines. The ends of the uses 138,140,144 are structured for electrical connection to an electrical power bus of a multiple meter unit (not shown) (e.g., the unit 215 of FIG. 12).

In accordance with the invention, the electrical power buses 138,140,144 of the surge protector unit 124 are secured to the corresponding buses 150,152,154, respectively, of the main disconnect unit 122. In a similar manner as the feeder buses 36 of FIG. 3, the electrical power buses 138,140,144 of the surge protector unit 124 have a first end 156 and an opposite second end 158. Similarly, as shown with the neutral line 142, the neutral bus 154 of the main disconnect unit 122 has a first end 160 and an opposite second end 162, with the first ends 156,160 preferably being the same, and with the opposite (or mating) second ends 158,162 preferably being the same. In turn, the first ends 156 of the buses 138,140,144 of the surge protector unit 124 are secured to second ends 162 of the buses 150,152,154, respectively, of the main disconnect unit 122. The second ends 158 of the buses 138,140,144 of the surge protector unit 124 and the first ends 160 of the buses 150,152,154 of the main disconnect unit 122 are structured for electrical connection to buses (not shown) of a multiple meter unit (e.g., the unit 215 of FIG. 12), as well as buses from power sources or buses to loads.

Figure 9:
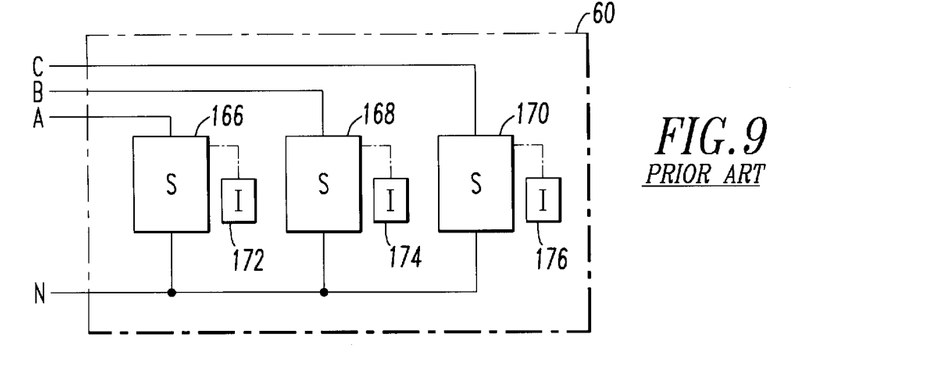
FIG. 9 is a block diagram of a surge protector device.

FIG. 9 shows a block diagram of the exemplary surge protector device 60 of FIG. 4. The device 60 includes three surge protectors 166,168,170 for the three-phase power lines A,B,C, and indicators (e.g., light emitting diodes) 172,174, 176, respectively, for those surge protectors in order to indicate that power is applied to the corresponding power line and that the corresponding surge protector is non-functional.

Figure 10:
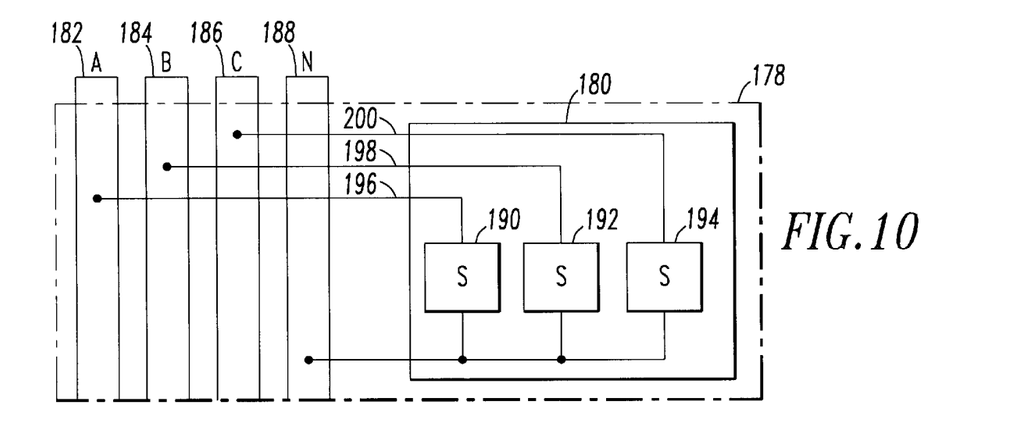
FIG. 10 is a block diagram of another embodiment of a surge protector unit in accordance with the invention.

FIG. 10 shows a block diagram of another surge protector unit 178 which includes a surge protector device 180 and three-phase plus neutral power buses 182,184,186,188. The exemplary surge protector device 180 includes line-to-neutral surge protectors 190,192,194, which are respectively electrically interconnected between the three-phase power buses 182,184,186 (A,B,C) and the neutral bus 188 (N). Unlike the embodiment of FIG. 4, the exemplary surge protector device 180 does not employ indicators and the electrical connections 196,198,200 are directly between the power buses 182,184,186 and the surge protectors 190,192, 194, respectively.

Figure 11:
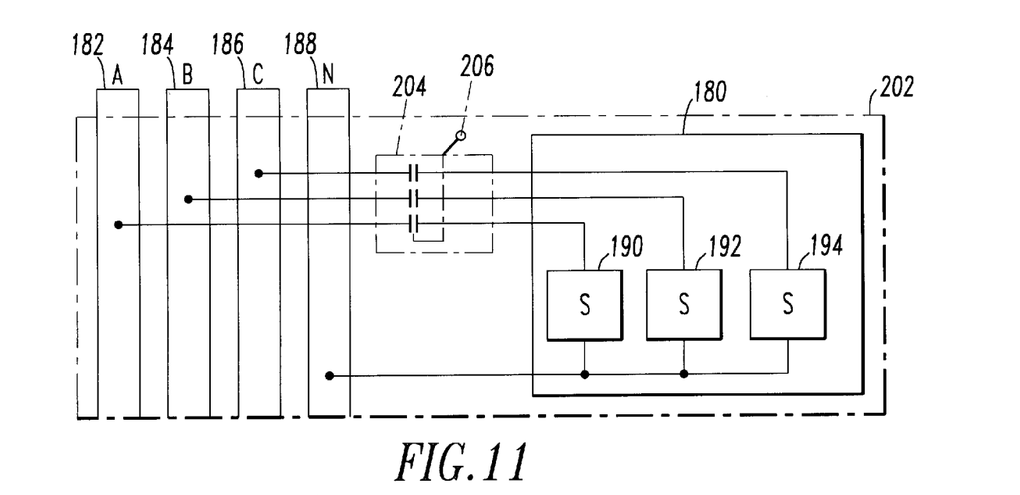
FIG. 11 is a block diagram of another embodiment of a surge protector unit in accordance with the invention.

Referring to FIG. 11, a block diagram of another surge protector unit 202 is shown. The unit 202 is similar to the unit 178 of FIG. 10, except that a three-phase switch 204 is electrically interconnected between the three-phase power buses 182,184,186 and the surge protectors 190,192,194, respectively. Since the switch 204 is electrically disposed between the electrical power bus bars and the surge protector device 180, the switch operating handle 206 may be employed to remove power from the surge protector device 180, in order to allow repair or maintenance to that device, without removing power from the entire electrical power distribution system. This is advantageous, for example, because the corresponding main disconnect unit (e.g., the main disconnect unit 4 of FIG. 1) typically feeds a plurality of different users (e.g., the tenants of various apartments).

FIG. 12 is a block diagram of an electrical power distribution system 208 which includes a surge protector unit 210, a main disconnect unit 212, and a multiple meter unit 214. The surge protector unit 210 and main disconnect unit 212 are similar to the surge protector unit 6 and disconnect unit 4, respectively, of FIG. 1. The meter unit 214 includes an enclosure 215, a meter 216 for each of the three exemplary loads or users U1,U2,U3, and separate disconnect switches 218 (e.g., a switch, a circuit breaker) for those users. The meters 216 show the power being consumed by the corresponding one of the loads. Each of the units 210,212,214 includes a three-phase (A,B,C) plus neutral (N) power bus 220, with the electrical power buses 222,224,226 of the surge protector unit 210, main disconnect unit 212, and multiple meter unit 214, respectively, being electrically connected in series. In a similar manner as discussed above in connection with FIGS. 3 and 8, the electrical power bus 222 electrically engages the adjacent bus 224 which, in turn, electrically engages the adjacent bus 226. While three exemplary tenant circuits are shown, the invention is applicable to a wide range of user counts. Preferably, the main disconnect unit 212 is employed in combination with the multiple meter unit 214 which, in turn, feeds individual downstream power users (e.g., plural apartments, offices).

The exemplary surge protector units 6,124,178,202,210 may be mounted in combination with new or existing disconnect units or other group metering applications. These surge protector units are mounted outside the enclosure of the disconnect unit and are secured onto the power busing of that unit. In this manner, the surge protector units protect all of the downstream users (e.g., apartments, offices) which are fed by the disconnect unit. Furthermore, the surge protector unit, which readily engages the disconnect unit, provides the added convenience and reliability of pre-wired internal electrical connections between the surge protection devices and the power buses thereof. Accordingly, an efficient and reliable connection to the power bus of the power distribution system is provided.

As shown in FIG. 12, the surge protector unit 210 is suitably mechanically mounted to the upstream side (e.g. the left side of FIG. 12) and is directly electrically connected to the electrical power bus 224 of the main disconnect unit 212 (e.g., a fuse and switch, a circuit breaker). Alternatively, as shown in FIG. 8, the surge protector unit 124 is mounted on the downstream side (e.g., the right side of FIG. 8) of the main disconnect unit 122. Although an exemplary configuration of the surge protector unit 210 (left), main disconnect unit 212 (center), and multiple meter unit 214 (right) is shown in FIG. 12, a wide range of equivalent configurations of these and other units may be provided in which the electrical power buses thereof are electrically connected in series.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An electrical power distribution system for at least one load, said electrical power distribution system comprising:
    a disconnect unit including an electrical power bus having a plurality of power lines, and means for interrupting current flowing in said power lines; and
    a surge protector unit including an electrical power bus having a plurality of power lines, and means for protecting said at least one load from surges or transients on said power lines, with the electrical power bus of said surge protector unit electrically engaging the electrical power bus of said disconnect unit to form a series electrical connection of said electrical power buses for said at least one load.

2. The electrical power distribution system of claim 1, wherein said means for interrupting includes separable contacts for disconnecting power from said at least one load.

3. The electrical power distribution system of claim 1, wherein said means for interrupting includes a fuse and a switch for disconnecting power from said at least one load.

4. The electrical power distribution system of claim 1, wherein said electrical power buses are three-phase electrical power buses.

5. The electrical power distribution system of claim 4, wherein said three-phase electrical power buses include a neutral bus.

6. The electrical power distribution system of claim 1, wherein said electrical power buses are single-phase, two-line electrical power buses.

7. The electrical power distribution system of claim 1, wherein the electrical power bus of said surge protector unit is secured to the electrical power bus of said disconnect unit.

8. The electrical power distribution system of claim 7, wherein the electrical power bus of said surge protector unit has a first end and an opposite second end; wherein the electrical power bus of said disconnect unit has a first end and an opposite second end; and wherein one of the first and second ends of the electrical power bus of said surge protector unit is secured to one of the second and first ends, respectively, of the electrical power bus of said disconnect unit.

9. The electrical power distribution system of claim 8, wherein the other of the first and second ends of the electrical power bus of said surge protector unit and the other of the second and first ends, respectively, of the electrical power bus of said disconnect unit are structured for electrical connection to an electrical power bus of a multiple meter unit.

10. The electrical power distribution system of claim 1, wherein each of said units includes an enclosure; wherein each of said electrical power buses includes a first rigid bus bar and a second rigid bus bar, with the first rigid bus bar being offset at a first end and projecting beyond said enclosure at a second end, and with the second end extending into a gap between the offset of the first rigid bus bar of an adjacent one of said units and being clamped by a fastener to electrically connect the electrical power buses of side by side ones of said units.

11. The electrical power distribution system of claim 1, wherein said means for protecting includes a plurality of surge protectors for the power lines of said surge protector unit, and a plurality of indicators for said surge protectors.

12. The electrical power distribution system of claim 11, wherein said surge protector unit further includes an enclosure having a cover for accessing said surge protectors and said indicators.

13. The electrical power distribution system of claim 12, wherein said surge protector unit further includes means for locking said cover.

14. The electrical power distribution system of claim 12, wherein the cover of the enclosure of said surge protector unit further includes a window for viewing said indicators therethrough.

15. The electrical power distribution system of claim 1, wherein said surge protector unit further includes a plurality of surge protectors for the power lines thereof, and an enclosure having a waterproof cover for accessing said surge protectors.

16. The electrical power distribution system of claim 1, wherein said surge protector unit further includes a surge protector for each of the power lines thereof, and an electrical connection between each of said power lines and the surge protector thereof.

17. The electrical power distribution system of claim 16, wherein said surge protector unit further includes a plural-phase switch electrically interconnected between said power lines and said surge protectors.

18. The electrical power distribution system of claim 16, wherein each of said electrical connections are directly connected between one of said power lines and one of said surge protectors.

19. An electrical power distribution system for a plurality of loads, said electrical power distribution system comprising:

a main disconnect unit including an electrical power bus having a plurality of power lines, and means for interrupting current flowing in said power lines;

a surge protector unit including an electrical power bus having a plurality of power lines, and means for protecting said loads from surges or transients on said power lines; and a multiple meter unit including a meter for each of said loads and an electrical power bus having a plurality of power lines, with the electrical power buses of said main disconnect unit, said surge protector unit and said multiple meter unit being electrically connected in series, and with the electrical power bus of one of said units electrically engaging the electrical power buses of the other two of said units.

20. The electrical power distribution system of claim 19, wherein each of said units includes an enclosure; wherein each of said electrical power buses includes a first rigid bus bar and a second rigid bus bar, with the first rigid bus bar being offset at a first end and projecting beyond said enclosure at a second end, and with the second end extending into a gap between the offset of the first rigid bus bar of an adjacent one of said units and being clamped by a fastener to electrically connect the electrical power buses of side by side ones of said units.

* * * * *